United States Patent
Leitao et al.

(10) Patent No.: US 11,048,477 B2
(45) Date of Patent: Jun. 29, 2021

(54) ENTROPY SERVER FOR RANDOM NUMBER GENERATION

(71) Applicant: INTERNATIONAL BUSINESS MACHINES CORPORATION, Armonk, NY (US)

(72) Inventors: Breno H. Leitao, Araraquara (BR); Juscelino Candido De Lima Junior, Campinas (BR); Alexander Aguina, Campinas (BR); Camilla da Graca Portes Ogurtsova, Campinas (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 16/140,579

(22) Filed: Sep. 25, 2018

(65) Prior Publication Data
US 2020/0097254 A1  Mar. 26, 2020

(51) Int. Cl.
*G06F 7/58* (2006.01)
*H03K 19/21* (2006.01)
*H04L 29/08* (2006.01)

(52) U.S. Cl.
CPC ........... *G06F 7/588* (2013.01); *H03K 19/212* (2013.01); *H04L 67/12* (2013.01)

(58) Field of Classification Search
CPC ........ G06F 7/588; H04L 67/12; H03K 19/212
See application file for complete search history.

(56) References Cited

U.S. PATENT DOCUMENTS

| | | | |
|---|---|---|---|
| 8,489,660 B2 | 7/2013 | Herbert et al. | |
| 9,270,455 B1 | 2/2016 | Ts'o | |
| 9,507,566 B2 | 11/2016 | Payne et al. | |
| 9,558,358 B2 | 1/2017 | Aissi et al. | |
| 9,658,832 B2 | 5/2017 | Tsirkin | |
| 2011/0047545 A1* | 2/2011 | Ellison | G06F 7/588 718/1 |
| 2011/0128081 A1* | 6/2011 | Hars | G06F 7/588 331/57 |
| 2012/0179735 A1 | 7/2012 | Ferguson et al. | |
| 2015/0006601 A1* | 1/2015 | Aissi | G06F 21/60 708/250 |
| 2016/0028544 A1* | 1/2016 | Hyde | H04L 9/0869 380/44 |
| 2016/0342394 A1* | 11/2016 | Tsirkin | H04L 9/002 |
| 2017/0085654 A1* | 3/2017 | Mikhailov | G06F 7/58 |
| 2018/0067726 A1 | 3/2018 | Sweeny et al. | |

OTHER PUBLICATIONS

Kumari, Rashmi, Thesis "Analysis of Linux Random Number Generator in Virtualized Environment" Submitted to the Faculty of Graduate Studies in Partial Fulfillment of the Requirements for the Degree of Master of Science, Graduate Program in Computer Science, May 2015; 121 pgs.

Wallace, Kyle et al. "Toward Sensor-Based Random Number Generation for Mobile and IoT Devices" IEEE Internet of Things Journal; IEEE 2015; pp. 1-13.

IDQ "Random Number Generation" retrieved at: https://www.idquantique.com/random-number-generation/; downloaded Aug. 31, 2020; 4 pgs.

\* cited by examiner

*Primary Examiner* — Michael D. Yaary
(74) *Attorney, Agent, or Firm* — Cantor Colburn LLP; Steven Chiu

(57) ABSTRACT

Embodiments include method, systems and computer program products for providing entropy to generate random numbers.

11 Claims, 4 Drawing Sheets

ENTROPY SERVER FOR RANDOM NUMBER GENERATION

BACKGROUND

The present disclosure relates to methods, systems and computer program products for providing entropy for random number generation.

Cryptography application and other security relevant features (e.g., generating cryptographic keys in SSL protocols, encryption, signatures, etc.) may require a constant flow of new random numbers that cannot be replicated or predicted. Currently there are several methods for generating random numbers. For example, a pseudo random number generator may generate random numbers, but the numbers generated may be deterministic. Another method for generating random numbers may be to use timings of I/O as random input. However, some computers may not have interactive I/O, and therefore do not have a source for random data.

SUMMARY

In accordance with an embodiment, a computer-implemented method for providing entropy to generate random numbers is provided. The method includes receiving, by a processor of an entropy server, a first data from a first sensor and a second data from a second sensor. The method also includes generating a first piece of entropy data based at least in part on a combination of the first data and the second data. Based on a determination that the first piece of entropy data exceeds a randomness threshold, the method includes providing the first piece of entropy data to a server via a dedicated communication link between the entropy server and the server.

In another embodiment, a computer program product comprising a non-transitory storage medium readable by a processing circuit and storing instructions for execution by the processing circuit for performing a method may be provided. The method includes receiving, by a processor of an entropy server, a first data from a first sensor and a second data from a second sensor. The method also includes generating a first piece of entropy data based at least in part on a combination of the first data and the second data. Based on a determination that the first piece of entropy data exceeds a randomness threshold, the method includes providing the first piece of entropy data to a server via a dedicated communication link between the entropy server and the server.

In another embodiment, a system for providing entropy to generate random numbers includes a processor in communication with one or more types of memory is provided. The processor is configured to receive, by the processor, a first data from a first sensor and a second data from a second sensor. The processor is also configured to generate a first piece of entropy data based at least in part on a combination of the first data and the second data. Based on a determination that the first piece of entropy data exceeds a randomness threshold, the processor is configured to provide the first piece of entropy data to a server via a dedicated communication link between the entropy server and the server.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
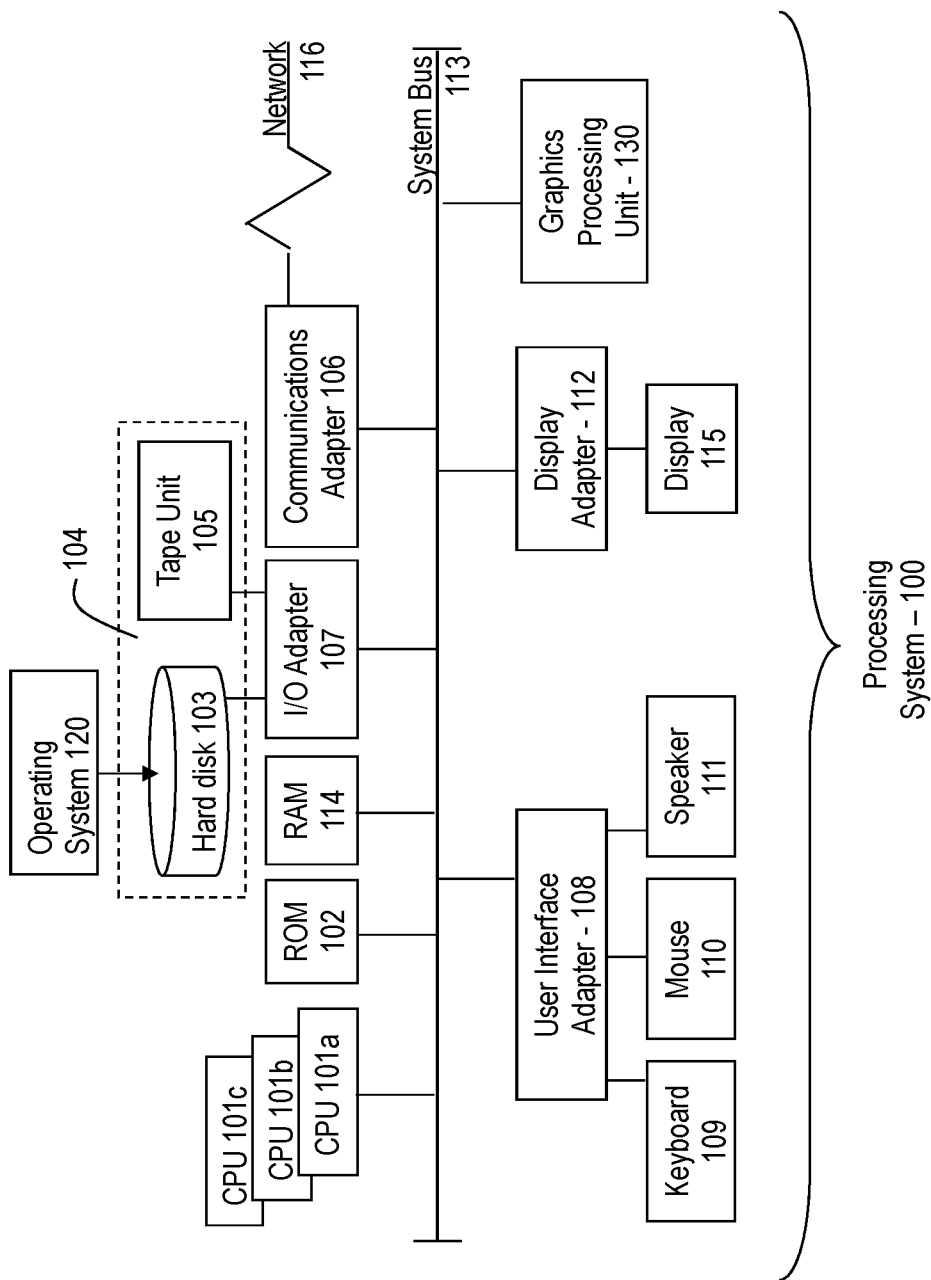
FIG. 1 is a block diagram illustrating one example of a processing system for practice of the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In accordance with exemplary embodiments of the disclosure, methods, systems and computer program products for providing entropy to generate random numbers are provided. The methods and systems described herein are directed to using an entropy server to provide entropy data to multiple servers for use in random number generation. In exemplary embodiments, the entropy server is in communication with a plurality of sensors, such as cameras or microphones, and is constantly receiving data from the sensors. The entropy server combines the data received from the sensors to create an entropy data that is provided to one or more servers. The entropy server is connected to the one or more servers via dedicated links to provide fast, reliable and secure communication from the entropy server to the one or more servers.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115.

Figure 2:
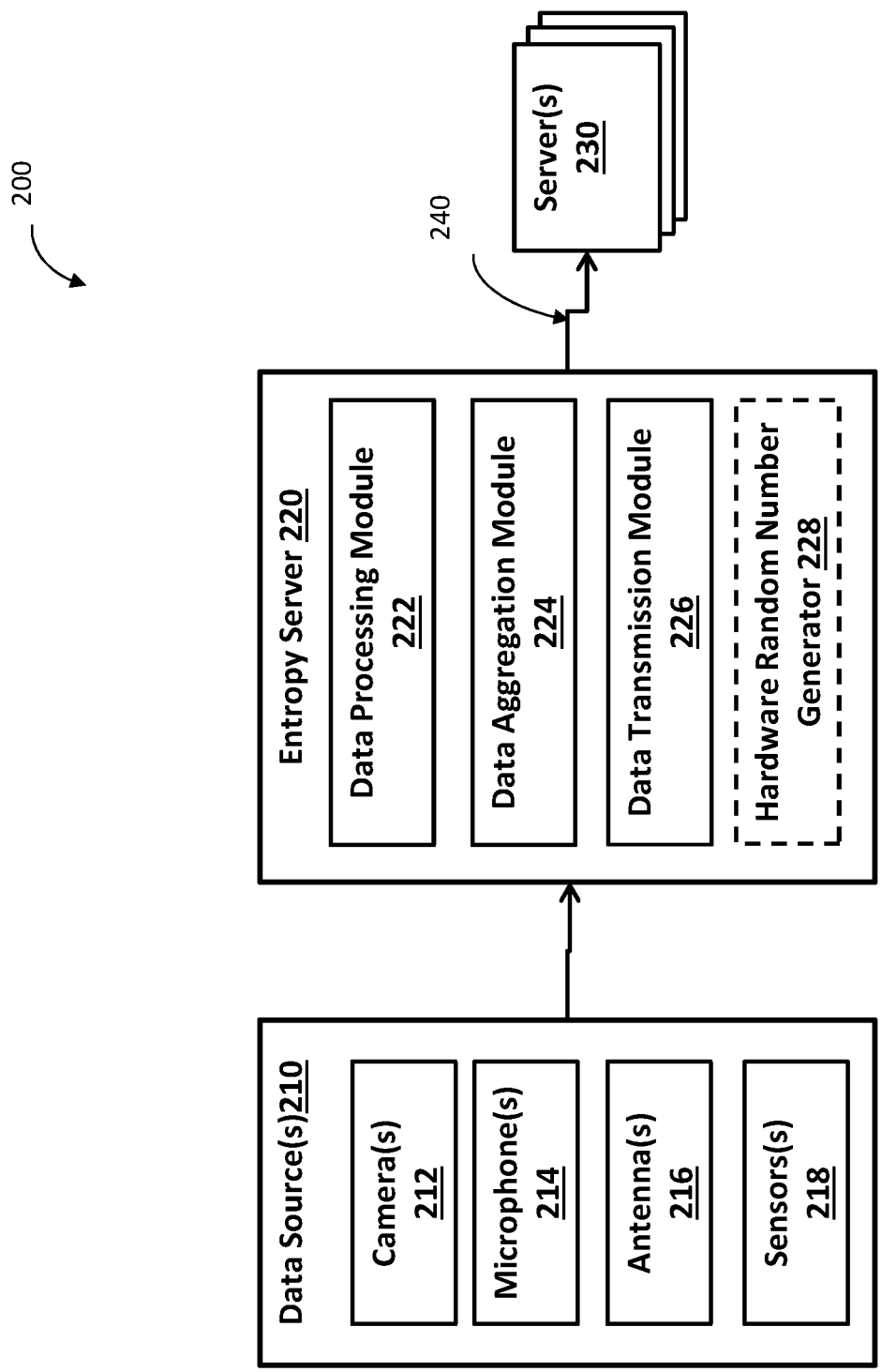
FIG. 2 is a block diagram illustrating a computing system in accordance with an exemplary embodiment.

Referring now to FIG. 2, a computing system 200 in accordance with an embodiment is illustrated. As illustrated, the computing system 200 includes one or more data sources 210, an entropy server 220, and one or more servers 230. In exemplary embodiments, data sources 210 include camera (s) 212, microphone(s) 214, antenna(s) 216, and/or other sensor(s) 218. Examples of other sensors 218 may include but are not limited to a gyroscope, accelerometer, or the like. In one embodiment, the entropy server 220 receives raw data captured by the data sources 210 and converts the data to digital data. In another embodiment, the entropy server 220 receives a digital bit stream from the data sources 210. In exemplary embodiments, additional sensors 218 can be used to provide data to the entropy server 220. In one example, the sensor includes an accelerometer that may capture analog vibration data. The vibrations may be generated by moving components internal to the entropy server such as cooling fans or come from an external source such as external vibration or the movement. The analog data generated or captured by the accelerometer may be converted into a digital form by the entropy server 220.

In exemplary embodiments, the entropy server 220 includes a data processing module 222, a data aggregation module 224, a data transmission module 226, and optionally a hardware random number generator 228. The data processing module 222 includes computer-readable instructions that in response to execution by the processor(s) 101 cause operations to be performed including receiving data from the data aggregation module 224 and generating entropy data. In some embodiments, the data processing module 222 may apply a hash to the data received from the data sources, it may filter the data received from the data sources and it may format the data received from the data sources to generate pieces of entropy data. In one embodiment, filter the data received from the data sources includes analyzing the data received from the data sources to ensure that the received data has a randomness score that exceeds a threshold value.

The data aggregation module 224 includes computer-readable instructions that, in response to execution by the processor(s) 101, cause operations to be performed including receiving data from data sources 210 and aggregating them to create an entropy data. In some embodiments, the pieces of data can be aggregated, or combined, by using an exclusive or operation on the data. In one embodiment, once the data from multiple sources has been combined, the entropy data is provided to the data processing module 222 by the data aggregation module 224. In exemplary embodiments, the data processing module 222 analyzes the entropy data to ensure that the entropy data is random. In other embodiments, the data processing module 222 analyzes the data received from the data sources 210 to ensure that the received data is random before the data is aggregated by the data aggregation module 224.

The data transmission module 226 includes computer-readable instructions that in response to execution by the processor(s) 101 cause operations to be performed including providing the entropy data to the one or more servers 230 via dedicated links 240. In some embodiments, the data transmission module 226 may encrypt or otherwise secure the entropy data and may transmit the entropy data over the dedicated links 240 to the servers 230. The servers 230 are configured to use the entropy data received from the entropy server to create random numbers.

In some embodiments, the server 230 may use the random number in a cryptographic mechanism. For instance, many aspect of cryptography may require random numbers. For examples, cryptographic mechanisms that may require a random number may include, but are not limited to, key generation, nonces, one-time pads, and salts (e.g., random data that is used as an additional input to a one-way function that hashes a password or passphrase) in certain signature schemes (e.g., elliptic curve digital signature algorithms).

Figure 3:
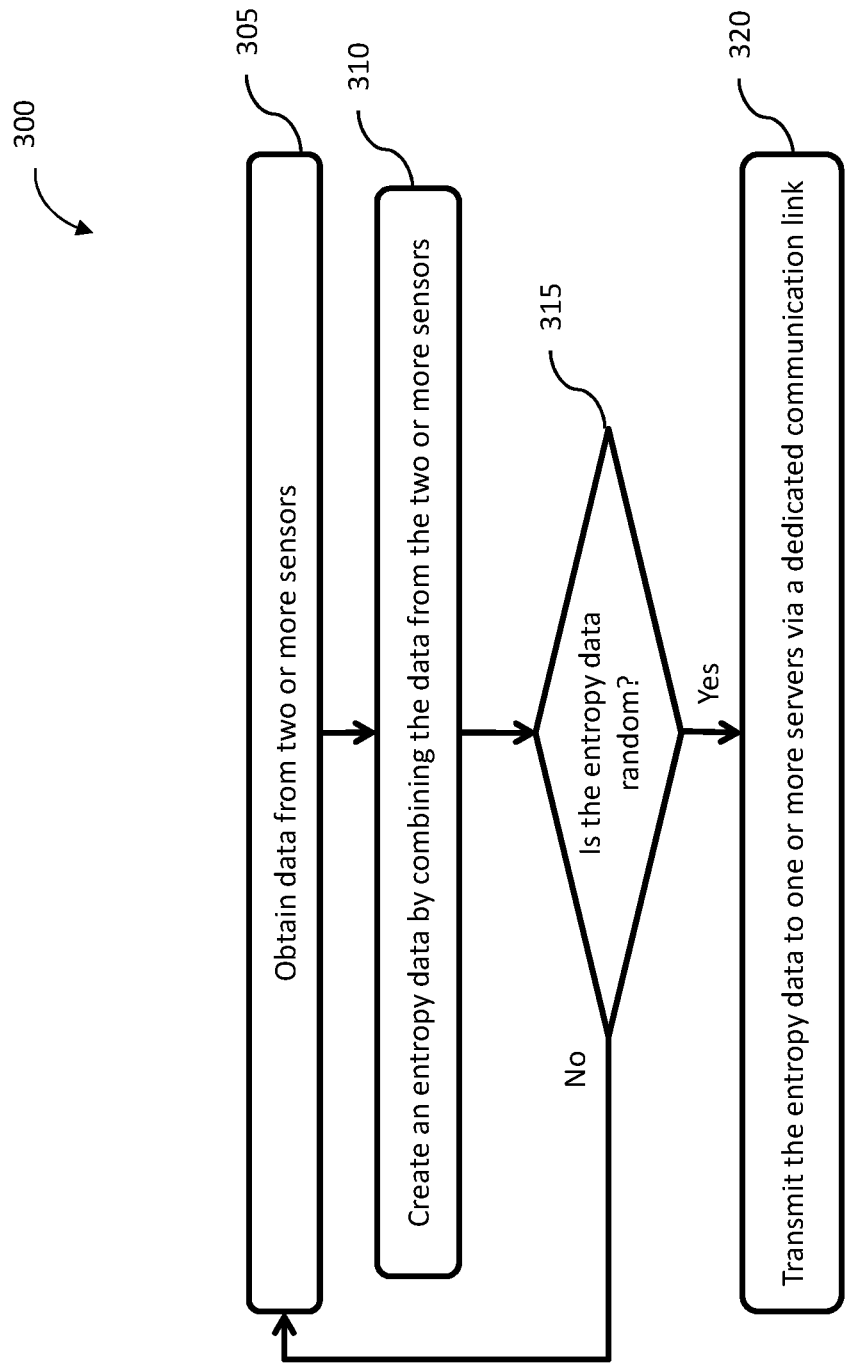
FIG. 3 is a flow diagram of a method for providing entropy to generate random numbers in accordance with an exemplary embodiment.

Now referring to FIG. 3, a flow diagram of a method 300 for providing entropy to generate random numbers in accordance with an exemplary embodiment is depicted. At shown at block 305, the method 300 includes obtaining data from two or more sensors. In exemplary embodiments, the sensors can include a camera, a microphone, an antenna or the like. Each of the sensors in communication with an entropy server and may be directly connected to the entropy server. Next, as shown at block 310, the method includes creating an entropy data by combining the data received from the two or more sensors. In exemplary embodiments, combining the data from the two or more sensors includes performing a logical exclusive or (XOR) operation on the two data sets. The method 300 also includes determining if the entropy data created by combining the data received from the two or more sensors is random. In one embodiment, a randomness score is created by analyzing the entropy data and the determination of whether the entropy data is random is based on determining that the randomness score exceeds a threshold value. If it is determined that the entropy data is random, the entropy data is transmitted to one or more servers via a dedicated communication link, as shown at block 320. Otherwise, the method 300 returns to block 305 and obtains new data samples from the two or more sensors.

The entropy data is evaluated for randomness by performing a bit-level analysis on the entropy data. In one embodiment, the method for determining if the entropy data is random includes analyzing the distribution of ones and zeroes at each bit position. If the entropy data is, the number of ones and zeroes is likely to be approximately equal. In another embodiment, the method for determining if the entropy data is random includes dividing the bit sequence of the entropy data into consecutive, non-overlapping groups of four, and derives a four-bit number from each group. The method then counts the number of occurrences of each of the 16 possible numbers, and performs a chi-square calculation to evaluate this distribution. If the entropy data is randomly generated, the distribution of four-bit numbers is likely to be approximately uniform. In a further embodiment, the method for determining if the entropy data is random includes dividing the entropy data into runs of consecutive bits which have the same value. It then counts the number of runs with a length of 1, 2, 3, 4, 5, and 6 and above. If the entropy data is random, the number of runs with each of these lengths is likely to be within a range determined by the size of the sample set. It will be appreciated by those of ordinary skill in the art that additional methods can be used to determine if the entropy data is random.

Figure 4:
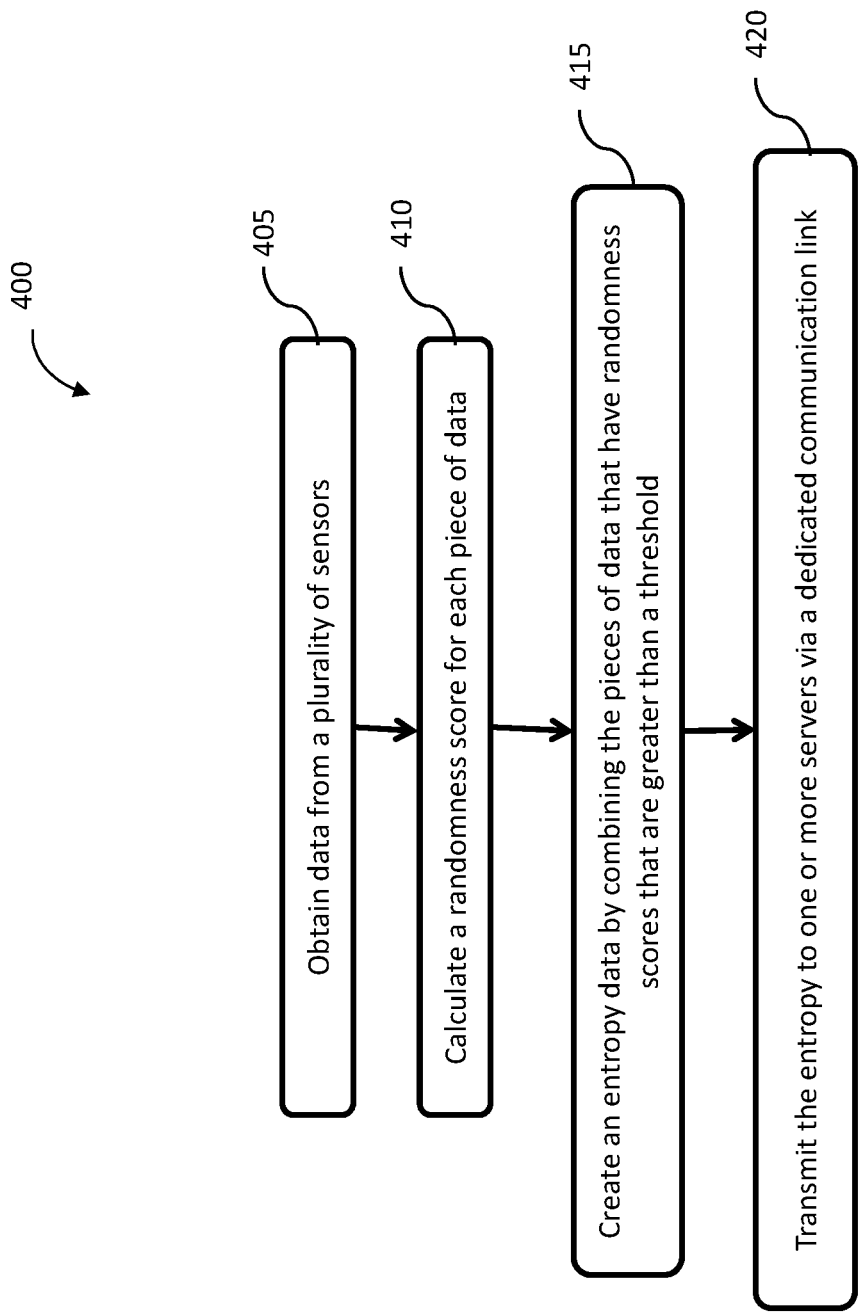
FIG. 4 is a flow diagram of another method for providing entropy to generate random numbers in accordance with an exemplary embodiment.

Now referring to FIG. 4, a flow diagram of a method 400 for providing entropy to generate random numbers in accordance with an exemplary embodiment is depicted. As shown at block 405, the method 400 includes obtaining data from a plurality of sensors. In exemplary embodiments, the sensors can include a camera, a microphone, an antenna or the like. Each of the sensors are in communication with an entropy server and may be directly connected to the entropy server. Next, as shown at block 410, the method 400 includes calculating a randomness score for each piece of data received. The randomness score is determined by performing a bit-level analysis on the data received from each of the plurality of sensors. The randomness score can be calculated using one of the above described techniques or by using any other known method for evaluating the randomness of a bit stream. The method 400 also includes creating an entropy data by combining the pieces of data that have randomness score that are greater than a threshold. In exemplary embodiments generating the random pieces of data are combined by performing a logical exclusive or operation. Next, as shown at block 420, the method 400 includes transmitting the entropy data to one or more servers via a dedicated communication link.

In exemplary embodiments, a single entropy server is configured to provide entropy data to multiple servers in a server rack. As a result, each of the servers do not need to include random number generation hardware.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for providing entropy to generate random numbers comprising:
    receiving, by a processor of an entropy server, a first data from a first sensor, wherein the first sensor is a camera in communication with the entropy server;
    receiving, by the processor, a second data from a second sensor, wherein the second sensor is a microphone in communication with the entropy server;
    receiving, by the processor, a third data from a third sensor, wherein the third sensor is an antenna in communication with the entropy server;
    calculating a randomness score for each piece of data received and comparing the randomness score to a randomness threshold value;
    generating a first piece of entropy data by combining each piece of data received having the randomness score that exceeds the randomness threshold value;
    based on a determination that the first piece of entropy data exceeds a randomness threshold, providing the first piece of entropy data to a server via a dedicated communication link between the entropy server and the server,
    wherein the determination that the first piece of entropy data exceeds a randomness threshold includes performing a bit-level analysis on the first piece of entropy data.

2. The computer-implemented method of claim 1, wherein generating a first piece of entropy data includes combining each piece of data received having the randomness score that exceeds the randomness threshold value via a logical exclusive or operation.

3. The computer-implemented method of claim 1, further comprising receiving, by the processor, a fourth data from a fourth sensor and wherein the fourth sensor is a hardware random number generator in communication with the entropy server.

4. The computer-implemented method of claim 1, wherein a number of sensors providing sensor data to the processor is determined based a number of servers the entropy server is providing entropy data to.

5. A computer program product comprising a non-transitory storage medium readable by a processing circuit and storing instructions for execution by the processing circuit for performing a method comprising:
   receiving, by a processor of an entropy server, a first data from a first sensor, wherein the first sensor is a camera in communication with the entropy server;
   receiving, by the processor, a second data from a second sensor, wherein the second sensor is a microphone in communication with the entropy server;
   receiving, by the processor, a third data from a third sensor, wherein the third sensor is an antenna in communication with the entropy server;
   calculating a randomness score for each piece of data received and comparing the randomness score to a randomness threshold value;
   generating a first piece of entropy data by combining each piece of data received having the randomness score that exceeds the randomness threshold value;
   based on a determination that the first piece of entropy data exceeds a randomness threshold, providing the first piece of entropy data to a server via a dedicated communication link between the entropy server and the server,
   wherein the determination that the first piece of entropy data exceeds a randomness threshold includes performing a bit-level analysis on the first piece of entropy data.

6. The computer program product of claim 5, wherein generating a first piece of entropy data includes combining each piece of data received having the randomness score that exceeds the randomness threshold value via a logical exclusive or operation.

7. The computer program product of claim 5, wherein the method further comprises receiving, by the processor, a fourth data from a fourth sensor and wherein the fourth sensor is a hardware random number generator in communication with the entropy server.

8. An entropy server for providing entropy to generate random numbers, comprising:
   a processor in communication with one or more types of memory, the processor configured to:
      receive a first data from a first sensor, wherein the first sensor is a camera in communication with the entropy server;
      receive a second data from a second sensor, wherein the second sensor is a microphone in communication with the entropy server;
      receive, by the processor, a third data from a third sensor, wherein the third sensor is an antenna in communication with the entropy server;
      calculate a randomness score for each piece of data received and comparing the randomness score to a randomness threshold value;
      generate a first piece of entropy data by combining each piece of data received having the randomness score that exceeds the randomness threshold value;
      based on a determination that the first piece of entropy data exceeds a randomness threshold, provide the first piece of entropy data to a server via a dedicated communication link between the entropy server and the server,
      wherein the determination that the first piece of entropy data exceeds a randomness threshold includes performing a bit-level analysis on the first piece of entropy data.

9. The entropy server of claim 8, wherein generating a first piece of entropy data includes combining each piece of data received having the randomness score that exceeds the randomness threshold value via a logical exclusive or operation.

10. The entropy server of claim 8, wherein the processor is further configured to receive a fourth data from a fourth sensor and wherein fourth sensor is a hardware random number generator in communication with the entropy serve.

11. The entropy server of claim 8, wherein the processor is further configured to discard the first piece of entropy data based on a determination that the first piece of entropy data does not exceed a randomness threshold.

* * * * *